(12) United States Patent
Brosnan et al.

(10) Patent No.: US 10,537,485 B2
(45) Date of Patent: *Jan. 21, 2020

(54) PERSON SUPPORT APPARATUS WITH ACTUATOR BRAKE CONTROL

(71) Applicant: Stryker Corporation, Kalamazoo, MI (US)

(72) Inventors: Daniel Vincent Brosnan, Kalamazoo, MI (US); Lavanya Vytla, Colts Neck, NJ (US); Aaron Douglas Furman, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,447

(22) Filed: May 31, 2018

(65) Prior Publication Data

US 2018/0271730 A1 Sep. 27, 2018

Related U.S. Application Data

(63) Continuation of application No. 14/838,693, filed on Aug. 28, 2015, now Pat. No. 10,004,653.

(60) Provisional application No. 62/053,498, filed on Sep. 22, 2014.

(51) Int. Cl.
| | | |
|---|---|---|
| *A61G 7/018* | (2006.01) | |
| *A61G 1/04* | (2006.01) | |
| *A61G 7/015* | (2006.01) | |
| *A61G 7/012* | (2006.01) | |
| *A61G 7/05* | (2006.01) | |

(52) U.S. Cl.
CPC ............... *A61G 7/018* (2013.01); *A61G 1/04* (2013.01); *A61G 7/015* (2013.01); *A61G 2203/36* (2013.01); *G05B 2219/36432* (2013.01); *G05B 2219/39196* (2013.01)

(58) Field of Classification Search
CPC .......... A61G 7/012; A61G 7/018; A61G 7/05; A61G 7/005; A61G 7/015; G05B 2219/36432; G05B 2219/39196; A47C 19/045
USPC ........................................................ 700/275
See application file for complete search history.

(56) References Cited

U.S. PATENT DOCUMENTS 8,266,743 B2 * 9/2012 Jones ................. A61G 13/0018
5/613
10,004,653 B2 * 6/2018 Brosnan ................. A61G 7/015

* cited by examiner

*Primary Examiner* — Michael J Brown
(74) *Attorney, Agent, or Firm* — Warner Norcross + Judd LLP

(57) ABSTRACT

A person support apparatus includes one or more motorized actuators that are braked in different manners depending upon whether or not electrical power is available to the control system. When electrical power is not available, a delay circuit delays closing a first switch that, when closed, short circuits the terminals of one of the motors. When power is available, other switches are opened and closed in a manner that short circuits the terminals of the motor while the first switch remains open. The other switches may be part of an H-bridge. The control system may also detect back emf (electromotive force) generated by the motor when electrical power is available and issue a notification to a technician or other user if an amplitude and/or duration of the detected back emf exceeds a threshold.

20 Claims, 6 Drawing Sheets

VALID STATES (0 = Open) (1 = Closed)

| SW1 | SW2 | SW3 | SW4 | SW5 | Result |
|---|---|---|---|---|---|
| 0 | 0 | 0 | 0 | 1 | Passive Brake |
| 0 | 1 | 0 | 1 | 0 | Active Low-side Brake |
| 1 | 0 | 1 | 0 | 0 | Active High-side Brake |
| 1 | 0 | 0 | 1 | 0 | Active Motor Drive with Positive Voltage |
| 0 | 1 | 1 | 0 | 0 | Active Motor Drive with Negative Voltage |
| 0 | 0 | 0 | 0 | 0 | |

# PERSON SUPPORT APPARATUS WITH ACTUATOR BRAKE CONTROL

CROSS-REFERENCE TO RELATED APPLICATIONS

This application is a continuation of U.S. patent application Ser. No. 14/838,693 filed Aug. 28, 2015, by inventors Daniel Vincent Brosnan et al. and entitled PERSON SUPPORT APPARATUS WITH ACTUATOR BRAKE CONTROL, and claims priority to U.S. provisional patent application Ser. No. 62/053,498 filed Sep. 22, 2014 by inventors Daniel Brosnan et al. and entitled PERSON SUPPORT APPARATUS WITH ACTUATOR BRAKE CONTROL, the complete disclosures of both of which are hereby incorporated herein by reference.

BACKGROUND

The present disclosure relates to person support apparatuses, such as, but not limited to, beds, cots, stretchers, recliners, chairs, operating tables, and the like; and more particularly to the control of one or more actuators on the person support apparatus.

Person support apparatuses often include one or more actuators for moving one or more components of the person support apparatus. For example, beds used in medical facilities often include a head section—sometimes referred to as a Fowler section—that is pivotable between a generally horizontal orientation and a raised orientation, thereby allowing an occupant thereof to move between lying flat and sitting upright. As another example, recliners often include one or more actuators for pivoting a backrest and/or for extending and retracting a leg rest. Regardless of the specific person support apparatus they are incorporated into, such actuators often also act as a brake upon the movement of the component when the actuator is not being actuated. That is, the actuator may act as a brake and resist movement of the component when the actuator is not being activated.

SUMMARY

In at least one embodiment, the present disclosure provides an improved system and/or method for controlling an actuator on a person support apparatus that provides greater braking force than would otherwise by achieved by simply removing electrical power from the actuator. The greater braking force means that the movable component controlled by the actuator is less likely to move when the actuator is not actuated, thereby reducing the possibility that a controller of the actuator will lose track of the current position of the actuator. The greater braking force also provides improved safety by preventing movement in situations where movement is not intended.

According to one embodiment, a person support apparatus is provided that includes a support surface adapted to support a person thereon, an actuator, a motor, and a control system. The actuator is adapted to move a first component of the person support apparatus with respect to a second component. The motor is adapted to power the actuator. The control system is adapted to brake the motor in a first manner when electrical power is supplied to the control system and to brake the motor in a second manner when electrical power is not supplied to the control system, wherein the first and second manners are different.

According to other embodiments, the control system delays braking the motor in the second manner for a predetermined time after electrical power is not supplied to the control system. In at least one embodiment, the predetermined time is based on a resistor-capacitor (RC) circuit.

In another embodiment, the first manner is a software controlled braking and the second manner is a hardware controlled braking.

In another embodiment, the control system uses a plurality of solid state switches for the first manner and either a solid state relay or an electromechanical relay for the second manner. The plurality of solid state switches include a plurality of field effect transistors (FETs) in at least one embodiment.

In at least one embodiment, the control system brakes the motor in the first manner by short circuiting terminals of the motor using a plurality of switches, and the control system brakes the motor in the second manner by short circuiting the terminals of the motor using a switch different from the plurality of switches.

The controller is a microcontroller in at least one embodiment that controls a plurality of switches. The microcontroller controls the plurality of switches so as to short circuit terminals of the motor in order to brake the motor in the first manner. A relay that is not controlled by the microcontroller short circuits the terminals of the motor in order to brake the motor in the second manner.

In some embodiments, the control system does not brake the motor in any other manner besides the first and second manners.

According to another embodiment, a person support apparatus is provided that includes a base having a plurality of wheels, a support surface, an actuator, a motor, and a control system. The support surface is adapted to support a person thereon and includes a backrest section, a seat section, and a leg section. The actuator moves at least one of the backrest, seat, and leg sections with respect to another of the backrest, seat and leg sections. The motor is adapted to power the actuator, and the control system brakes the motor by short circuiting terminals of the motor.

In other embodiments, the actuator is adapted to pivot the backrest section with respect to the seat section. In still other embodiments, the person support apparatus includes a second actuator adapted to move the leg section with respect to the seat section, and the second actuator includes a second motor adapted to power the second actuator. The control system is also adapted to brake the second motor by short circuiting the terminals of the second motor.

In other embodiments, the control system is adapted to short circuit the motor in two different manners: a first one when electrical power is supplied to the control system, and a second one when electrical power is not supplied to the control system.

The control system includes an H-bridge circuit having four switches in at least one embodiment, and the first manner includes closing at least two of the four switches. The second manner used by the control system short circuits the motor regardless of the open or closed states of the four switches.

According to another embodiment, a person support apparatus is provided that includes a base, a support surface, a first actuator, a second actuator, and a control system. The support surface is adapted to support a person thereon and includes a seat, a backrest, and a leg rest. The first actuator has a first motor adapted to pivot the backrest with respect to the seat, and the second actuator has a second motor adapted to pivot the seat with respect to the base. The control system brakes the first and second motors in a first manner when electrical power is supplied to the control system and brakes the first and second motors in a second manner when electrical power is not supplied to the control system. The first and second manners are different.

In another embodiment, the person support apparatus includes a third actuator having a third motor adapted to change the height of the seat relative to the base, and a fourth actuator having a fourth motor adapted to pivot the leg rest with respect to the seat. The control system brakes the third and fourth motors in the first manner when electrical power is supplied to the control system and brakes the third and fourth motors in the second manner when electrical power is not supplied to the control system. In some embodiments, the control system delays braking the first and second motors in the second manner for a predetermined time after electrical power is not supplied to the control system.

In still other embodiments, the first motor is included in a first H-bridge having four switches, and the second motor is included in a second H-bridge having four switches. The first manner includes closing at least two of the four switches of the first H-bridge and closing at least two of the four switches of the second H-bridge. The second manner short circuits each of the first and second motors regardless of the open or closed states of the four switches of the first H-bridge and regardless of the open or closed states of the four switches of the second H-bridge.

In at least one other embodiment, the control system includes a microcontroller for changing the states of the four switches of the first H-bridge and for changing the states of the four switches of the second H-bridge. The control system further includes a first relay for short circuiting the first motor when electrical power is not supplied to the control system and a second relay for short circuiting the second motor when electrical power is not supplied to the control system.

The control system is adapted in one or more embodiments to detect back-emf created by the motor when the motor is not being driven. Such back-emf is created when a force is applied to the component of the person support apparatus that is moved by the motor. The detected back-emf is repetitively compared to one or more threshold values to determine if its amplitude, an integral of its amplitude, or another quantity based on its amplitude exceeds one or more thresholds. If such a threshold is exceeded, the controller issues a notification of a potential error.

In any of the embodiments disclosed herein, the person support apparatus may be a recliner or a bed.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
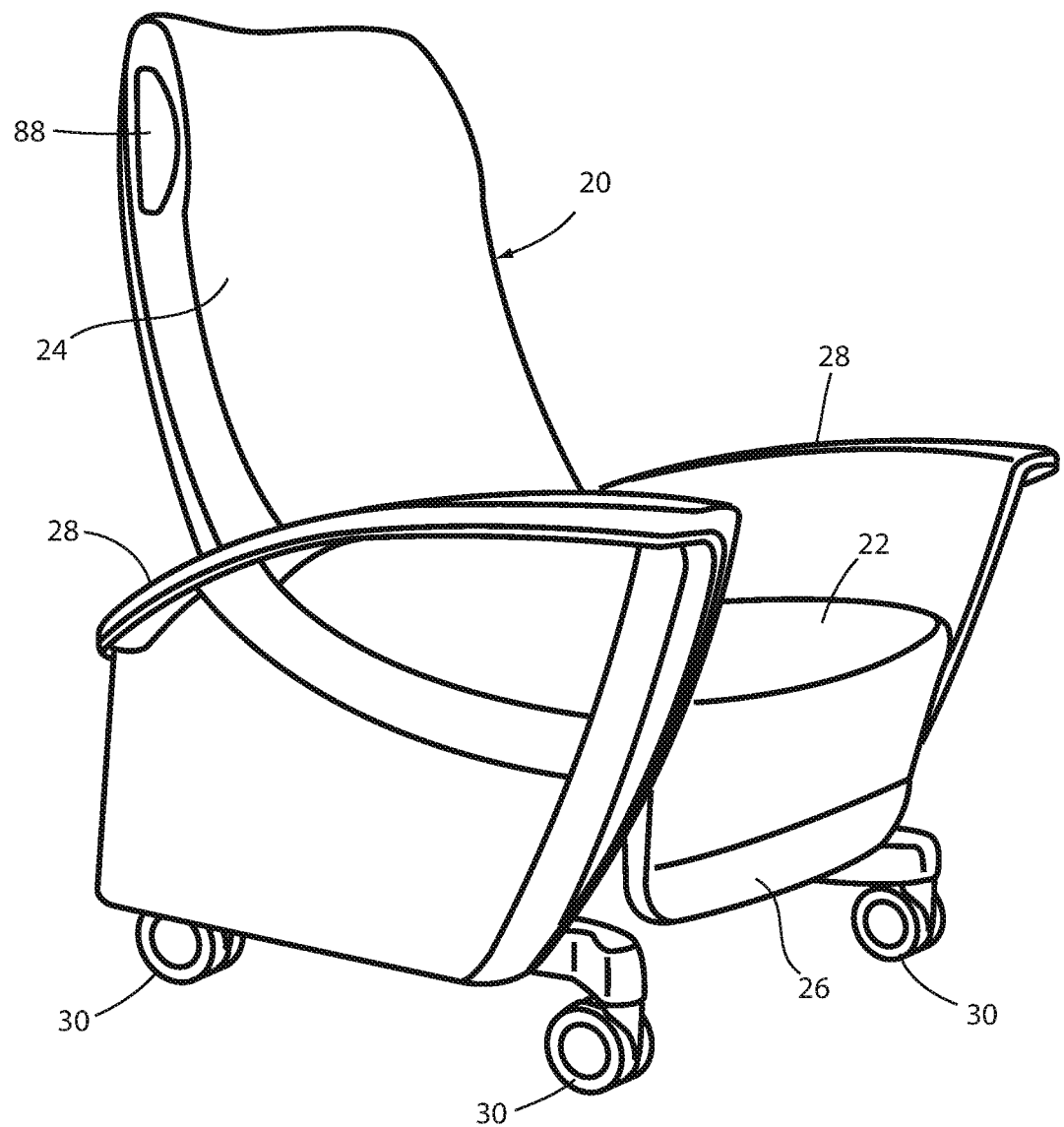
FIG. 1 is a perspective view of one embodiment of a person support apparatus according to one aspect of the present disclosure.

A person support apparatus 20 according to one embodiment is shown in FIG. 1. Person support apparatus 20 is shown in FIG. 1 to be a recliner. Although the following written description will be made with respect to a recliner, it will be understood by those skilled in the art that the principles disclosed herein may also be incorporated into other types of person support apparatuses besides recliners, such as, but not limited to, beds, stretchers, cots, surgical tables, chairs, or the like.

Person support apparatus 20 includes a seat 22, a backrest 24, a leg rest 26, a pair of armrests 28, and a plurality of wheels 30. Person support apparatus 20 is constructed such that both the height and tilt of seat 22 is adjustable. Further, person support apparatus 20 is constructed such that backrest 24 is pivotable between a generally upright position, such as shown in FIG. 1, and a virtually infinite number of rearwardly reclined positions. Leg rest 26 is constructed such that it is able to be moved between a retracted position, such as shown in FIG. 1, and an extended position, in which leg rest 26 is oriented generally horizontally and extends forwardly from seat 22. Armrests 28, in the illustrated embodiment, are constructed such that a user can raise and lower their height relative to seat 22.

In at least one embodiment, it will be understood that person support apparatus 20 may be constructed in accordance with any of the embodiments disclosed in commonly assigned, copending U.S. patent application Ser. No. 14/212,253 filed Mar. 14, 2014 by inventors Christopher Hough et al. and entitled MEDICAL SUPPORT APPARATUS, the complete disclosure of which is incorporated herein by reference. The movement and control of person support apparatus 20 may also be carried out in accordance with the disclosure of commonly assigned, copending U.S. provisional patent application Ser. No. 62/029,142 filed Jul. 25, 2014 by inventors Anish Paul et al. and entitled MEDICAL SUPPORT APPARATUS, the complete disclosure of which is also incorporated herein by reference. Person support apparatus may also be constructed in other manners besides those described in these two commonly assigned patent applications.

Figure 2:
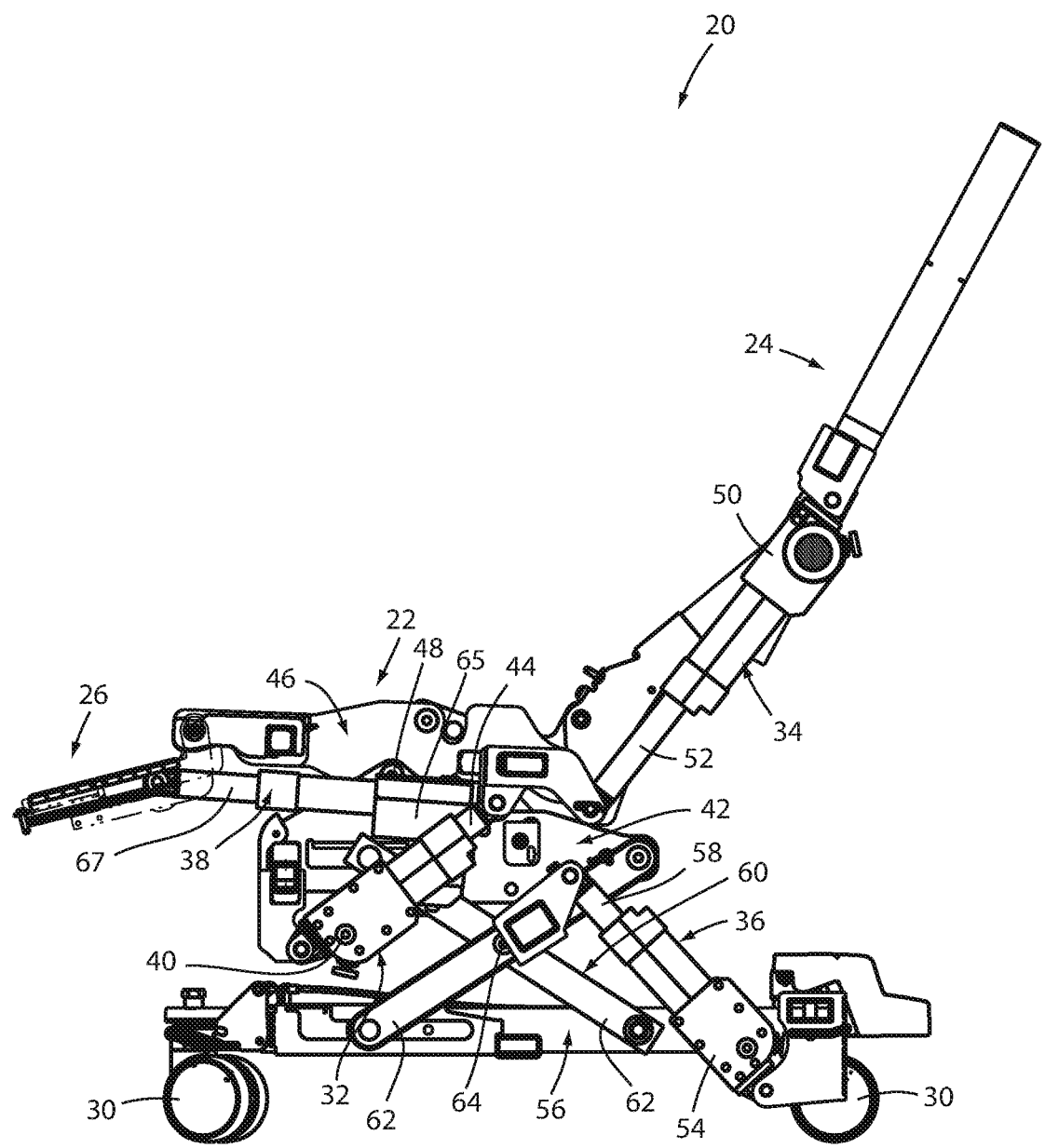
FIG. 2 is a side elevational view of the person support apparatus of FIG. 1 with several components removed in order to illustrate a plurality of actuators incorporated into the person support apparatus.

FIG. 2 shows various internal components of person support apparatus 20, including a seat actuator 32, a backrest actuator 34, a lift actuator 36, and a leg rest actuator 38. Each of actuators 32, 34, 36, and 38 are motorized linear actuators that are designed to linearly extend and retract under the control of a controller. Seat actuator 32 includes a stationary end 40 that is pivotally mounted to a chassis 42 of person support apparatus 20. Seat actuator 32 further includes an extendible end 44 that is pivotally mounted to a seat frame 46. When seat actuator 32 extends or retracts, extendible end 44 causes seat frame 46 to pivot about a seat pivot axis 48. The extension of seat actuator 32 therefore causes seat frame 46 to tilt in such a manner that a forward end of seat 22 moves downward relative to a backward end of seat 22 (i.e. seat frame 46 will rotate in a counterclockwise direction as shown in FIG. 2). The retraction of seat actuator 32 will, in contrast, cause seat frame 46 to tilt in the opposite manner (i.e. seat frame 46 will rotate in a clockwise direction as shown in FIG. 2).

Backrest actuator 34 includes a stationary end 50 that is mounted to backrest 24 and an extendible end 52 that is mounted to seat frame 46. The extension and retraction of backrest actuator 34 will therefore cause backrest 24 to pivot with respect to seat frame 46. More specifically, when backrest actuator 34 extends, backrest 24 will rotate in a counterclockwise direction in FIG. 3. In contrast, when backrest actuator 34 retracts, backrest 24 will rotate in a clockwise direction in FIG. 3. Because backrest 24 is coupled to seat frame 46, the rotation of seat frame 46 by seat actuator 32 will also cause backrest 24 to rotate with respect to the floor as seat frame 46 rotates. This rotation, however, will be independent of the rotation of backrest 24 caused by backrest actuator 34. In other words, the relative angle between backrest 24 and seat 22 will only change when backrest actuator 34 is actuated (and not when seat actuator 32 extends or retracts while backrest actuator 34 does not change length). The angle of backrest 24 with respect to the floor (or another fixed reference), however, will change as seat frame 46 pivots about seat pivot axis 48.

Leg rest actuator 38 includes a stationary end 65 that is mounted to seat frame 46 and an extendible end 57 that is mounted to leg rest 26. The extension of leg rest actuator 38 therefore will pivot leg rest 26 from a retracted position (e.g. FIG. 1) to an extended position in front of seat 22. The physical construction of leg rest 26 may take on any of the forms disclosed in the commonly assigned U.S. patent application Ser. No. 14/212,253 mentioned above, whose disclosure is incorporated completely herein by reference. Other physical constructions of leg rest 26 are also possible. The extension and retraction of leg rest actuator 38 will change the orientation of leg rest 26 with respect to seat frame 46. The orientation of leg rest 26 with respect to seat frame 46 will not change based on the extension or contraction of any other actuators 32, 34, or 36. The orientation of leg rest 26 with respect to the floor (or some other fixed reference), however, will change when seat frame 46 is pivoted about seat pivot axis 48 by seat actuator 32. In summary, then, the pivoting of seat frame 46 about its pivot axis 48 will therefore change the orientations of all of seat 22, backrest 24, and leg rest 26 with respect to the floor (or other fixed reference), but will not, by itself, change the orientations of any of these components (seat 22, backrest 24, and leg rest 26) with respect to each other.

Lift actuator 36 includes a stationary end 54 that is coupled to a base 56 and an extendible end 58 that is coupled to an X-frame lift 60. X-frame lift 60 includes two legs 62 that are pivotally coupled to each other about a center axis 64. When lift actuator 36 extends or retracts, the relative angle between each of the legs 62 changes, which changes the overall height of X-frame lift 60. Further, because chassis 42 is mounted on a top end of X-frame lift, the changing height of X-frame lift changes the height of chassis 42. Lift actuator 36 therefore raises the height of chassis 42 when it extends and lowers the height of chassis 42 when it retracts. Because seat frame 46 is mounted (pivotally) on chassis 42, and because backrest 24 and leg rest 26 are both mounted to seat frame 46, raising and lowering the height of chassis 42 simultaneously raises and lowers the height of seat 22, backrest 24, and leg rest 26. However, extending and retracting lift actuator 36 does not, by itself, change the angular orientations of any of leg rest 26, backrest 24, and/or seat 22, either with respect to each other or with respect to the floor.

Figures 3, 4:
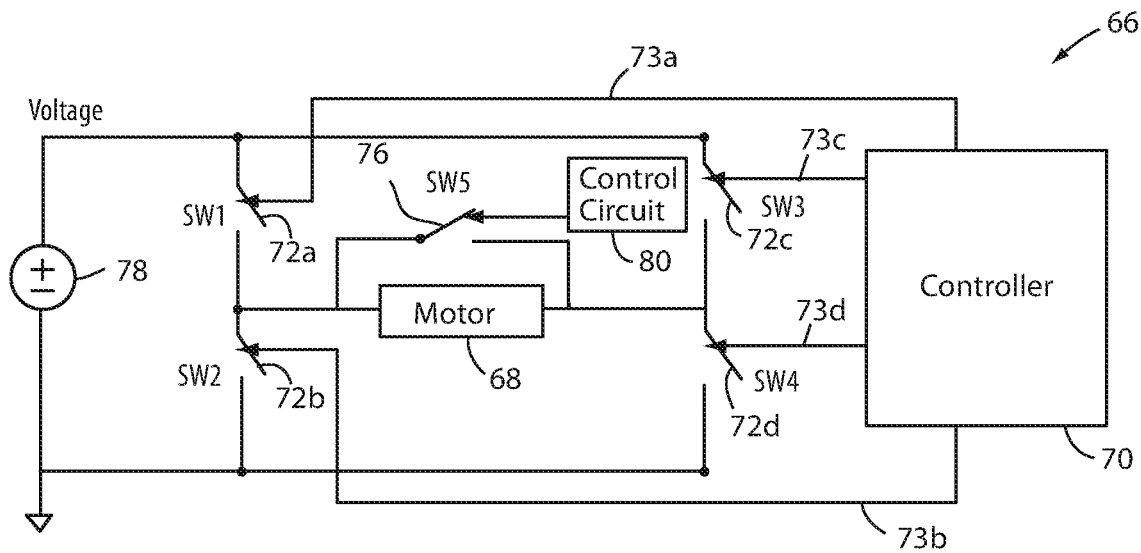
FIG. 3 is a block diagram of an actuator control system for one of the actuators of the person support apparatus of FIG. 1.
FIG. 4 is a state table illustrating the states of the actuator control system of FIG. 4 based on the state of the switches of the control system.

Each of the actuators 32-38 is powered by a direct current (DC) electrical motor. That is, each of the actuators 32-38 will extend or retract in response to its associated motor being driven in one direction or its opposite direction. The control of each motor is carried out by a control system 66. FIG. 3 illustrates the portion of control system 66 that is used to control the operation of one motor 68 that is used to power one of actuators 32-38. It will be understood by those skilled in the art that control system 66 controls each of the other three actuators in the same manner as shown in FIG. 3 and described in more detail below.

Control system 66 includes a controller 70 that is in communication with motor 68 which, as noted above, controls the extension and retraction of a corresponding one of the actuators 32-38. Controller 70 is constructed of any electrical component, or group of electrical components, that are capable of carrying out the functions described herein. In many embodiments, controller 70 is a conventional microcontroller, although not all such embodiments need include a microcontroller. In general, controller 70 includes any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 70 in carrying out the functions described herein, as well as the data necessary for carrying out these functions are stored in memory accessible to controller 70.

Controller 70 is in electrical communication with four switches 72a-d that, together with motor 68, define an H-bridge 74 (FIG. 3). Controller 70 communicates with switches 72a-d via lines 73a-d, respectively. A control circuit 80 is also included within control system 66 and is in electrical communication with a fifth switch 76. A voltage source 78 supplies electrical power to motor 68, depending upon the states of switches 72a-d and 76, as will be described in greater detail below. Voltage source 78 may be a battery and/or it may be a rectifier or other circuitry that receives AC power from a wall outlet via an AC power cable and provides a source of electrical current for driving motor 68. Motor 68 is, in one embodiment, a brushed DC motor.

The control of the operation of motor 68 in FIG. 3 is carried out through the selective opening and closing of switches 72*a-d* and 76. More specifically, FIG. 4 illustrates how the state of each of the switches 72*a-d* and 76 is changed in order to carry out the control of motor 68. Thus, with reference to FIGS. 3 and 4, controller 70 is configured to drive motor 68 in a first direction by closing switches 72*a* and 72*d* while opening switches 72*b* and 72*c*. This electrically couples a voltage source 78 to the motor 68 in a positive manner, thereby driving motor 68 in the first direction. Controller 70 is further configured to drive motor 68 in a second and opposite direction by closing switches 72*b* and 72*c* while opening switches 72*a* and 72*d*. This switch configuration electrically couples voltage source 78 to motor 68 in a negative manner, thereby driving motor 68 in the second, opposite direction. If it is desirable to allow motor 68 to freewheel at some point, controller 70 effectuates this by opening all four of switches 72*a-d*.

Control system 66 is also configured to brake motor 68 in at least two different manners. In a first manner, controller 70 actively brakes motor 68 when no movement is desired by implementing either an active low-side brake or an active hi-side brake. The active low-side brake is implemented when controller 70 closes switches 72*b* and 72*d* while opening switches 72*a* and 72*c*. This effectively creates an electrical short circuit between the terminals of motor 68. The active hi-side brake is implemented when controller 70 closes switches 72*a* and 72*c* while opening switches 72*b* and 72*d*. This also effectively creates an electrical short circuit between the terminals of motor 68. In one embodiment, controller 70 implements the active low-side braking whenever electrical power is being supplied to controller 70 and no movement of motor 68 is desired (e.g. a user is not activating a button, or other control, that causes movement of person support apparatus 20), although it will be understood by those skilled in the art that controller 70 could alternatively implement active high-side braking whenever electrical power is being supplied to controller 70.

As noted, control system 66 is also adapted to brake motor 68 in a second manner. More specifically, control system 66 is configured to brake motor 68 in a passive manner using hardware if and when electrical power is not present. That is, if voltage source 78 is disconnected, fails, or becomes depleted, control system 66 automatically brakes motor 68 in a second manner. More specifically, control system 66 automatically brakes motor 68 during a loss of voltage source 78 by closing fifth switch 76. The closing of fifth switch 76 is not carried out by controller 70 in the illustrated embodiment. Rather, fifth switch 76 is a normally closed relay that is opened by control circuit 80 when electrical power is supplied to control system 66 (e.g. when voltage source 78 is functional). Fifth switch 76 may be an electromechanical relay, or it may be a solid state relay, or it may be some other type of switch. Control circuit 80 is adapted to keep switch 76 open so long as sufficient electrical power continues to be supplied by voltage source 78. If and when voltage source 78 fails, control circuit 80 no longer remains able to keep fifth switch 76 in an open stated, and switch 76 therefore reverts to its normally closed state. In this normally closed state, fifth switch 76 effectively short circuits the two terminals of motor 68, thereby braking motor 68. The braking of motor 68 by fifth switch 76 occurs regardless of the state of any or all of switches 72*a, b, c*, and/or d. In the specific embodiment illustrated in FIG. 5, switches 72*a, b, c*, and *d* will all be open when motor 68 is braked in the second manner due to a lack of power supplied to the transistors 72*a, b, c*, and *d* illustrated therein.

Figure 6:
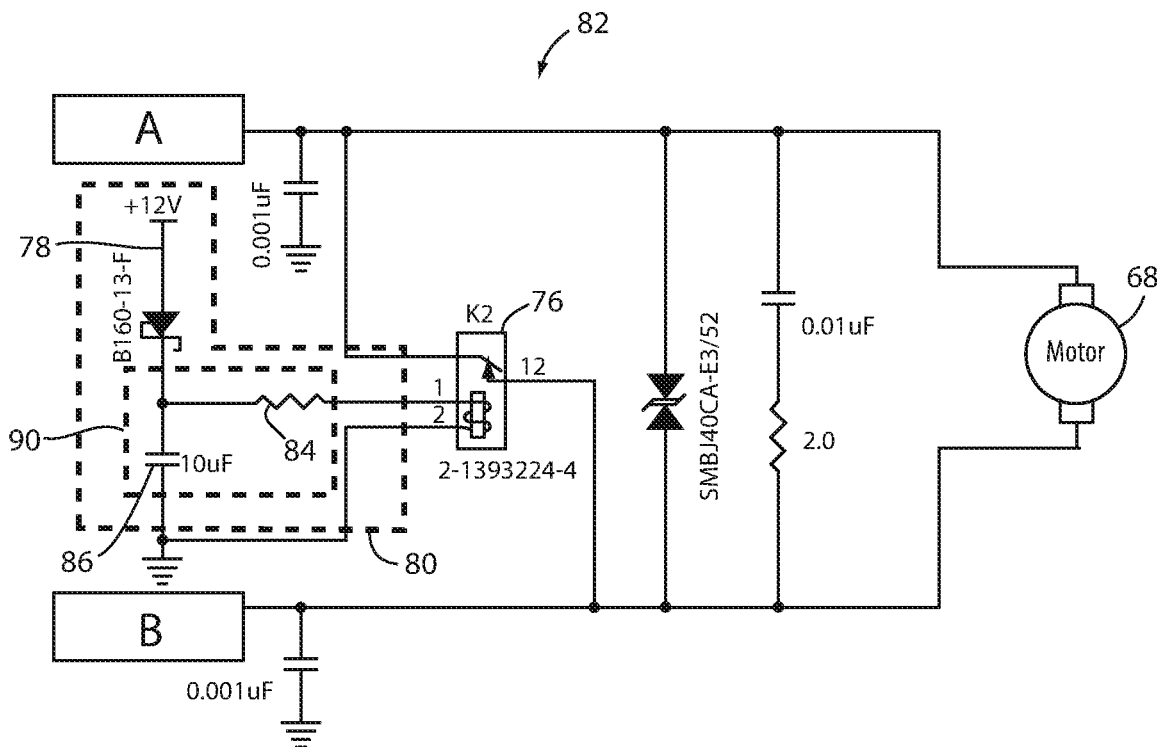
FIG. 6 is an electrical schematic of a first embodiment of a motor circuit that may be coupled to leads A and B of the circuit of FIG. 5.

In one embodiment, such as shown in FIG. 6, control circuit 80 includes a delay circuit 90 that is configured to delay the closing of fifth switch 76 for a fraction of a second—or longer in other embodiments—after a power loss is experienced. This delay helps prevent any damage that might otherwise occur to one or more of switches 72*a, b, c*, and/or d were the closing of fifth switch 76 to occur instantaneously after a power loss, particularly where switches 72*a, b, c*, and/or d are implemented as solid state devices. Delay circuit 90 of FIG. 6 includes a resistor 84 and a capacitor 86 coupled to one of the inputs of switch 76.

Figure 5:
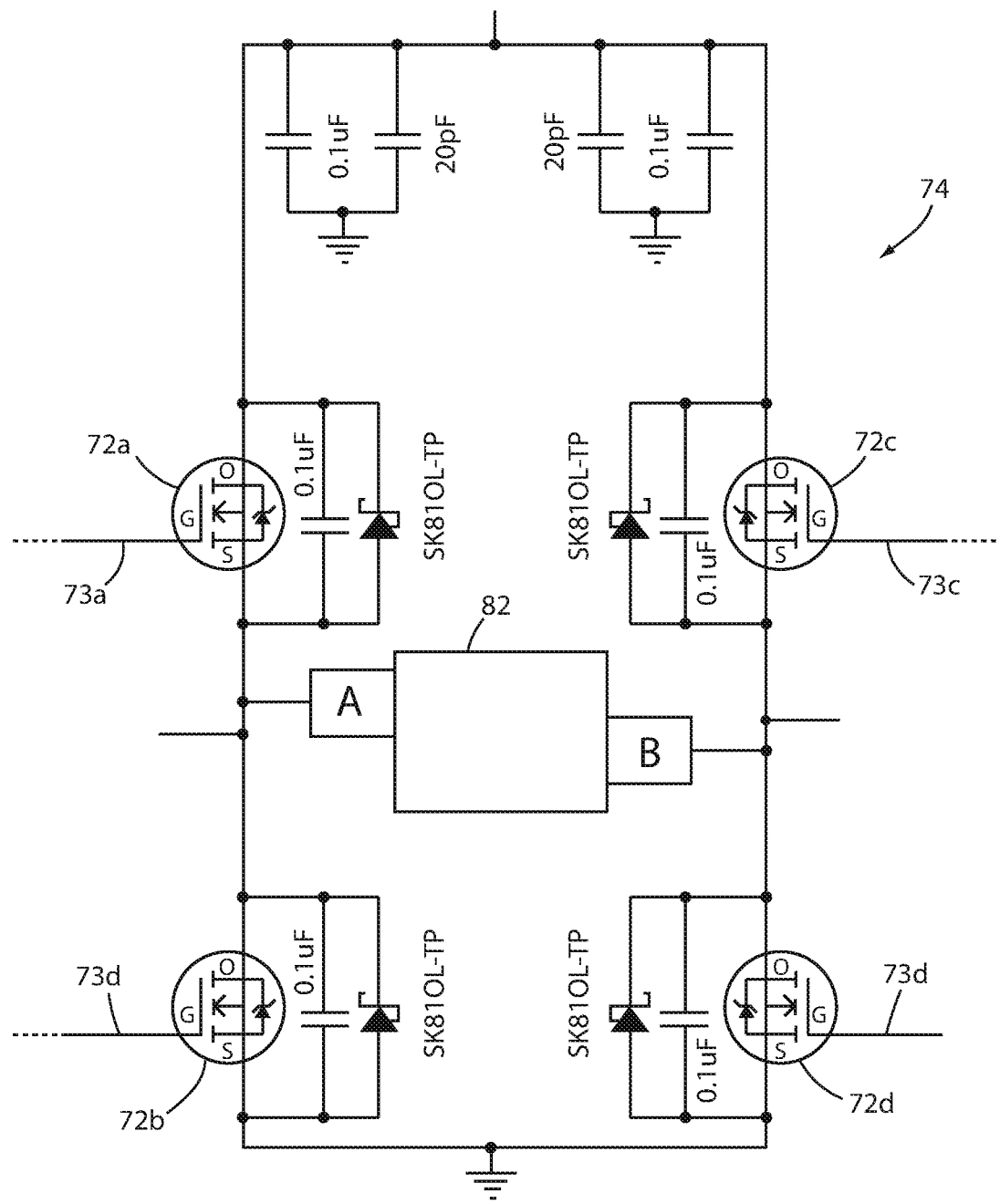
FIG. 5 is an electrical schematic of an embodiment of an H-bridge circuit for implementing the actuator control system of FIG. 3.

FIGS. 5 and 6 illustrate in greater detail one manner in which switches 72*a, b, c*, and *d* may be implemented, as well as fifth switch 76 and control circuit 80. In the embodiment shown in FIG. 5, switches 72*a-d* of H-bridge 74 are each implemented as Metal-Oxide Semiconductor Field Effect Transistors (MOSFETs). Each MOSFET has a gate terminal that is electrically coupled to an output of controller 70 (not shown in FIG. 5). Controller 70 controls the voltage supplied to each of these gate terminals, thereby controlling the switching of each of the MOSFETs. In one embodiment, where controller 70 is implemented as a microcontroller, the control of MOSFETs 72 is carried out via the software executed by the microcontroller, which determines the timing of the electrical signals supplied to the gates of each of the MOSFETs 72.

FIG. 6 illustrates in greater detail one manner of constructing a motor circuit 82 that is coupled between terminals A and B of control system 66. The content of motor circuit 82 is represented generically in FIG. 5 as a box. However, two different manners of implementing this motor circuit 82 are shown in detail in FIGS. 6 and 7 (circuit 82*a* in FIG. 7). Motor circuit 82 of FIG. 6 illustrates fifth switch 76, control circuit 80, delay circuit 90, and connections to motor 68. Delay circuit 90, as noted previously, includes resistor 84 and capacitor 86 arranged in series with each other and electrically coupled to one terminal of fifth switch 76. Resistor 84 and capacitor 86 define a resistive-capacitive (RC) circuit having a time constant that is determined by the values of resistor 84 and capacitor 86. When voltage source 78 is terminated, control circuit 80 will continue to supply a positive voltage to one terminal of fifth switch 76 for a time generally equal to the RC time constant of circuit 80. This will have the effect of keeping fifth switch 76 open for a fraction of a second after electrical power is lost, thereby helping to prevent damage to any of MOSFETs 72*a-d*. After a time equal to or greater than the RC time constant passes, fifth switch 76 will return to its normally closed state, thereby short circuiting the terminals of motor 68 and braking motor 68 from further movement.

When controller 70 effectuates the braking of motor 68 through either active low-side or active high side braking, no voltage is applied to the terminals of motor 68. That is, neither controller 70 nor any other control circuitry applies a difference to the motor terminals in order to generate a torque in motor 68 that resists a force being applied to the actuator which motor 68 powers. Instead, for the active high side braking, voltage source 78 is applied to both terminals of motor 68; and for the active low side braking, both terminals of motor 68 are coupled directly to ground. In both of these types of active braking (low and high), the braking power that results is due to the short circuiting of the motor terminals and the consequent back EMF (electromotive force) that is generated when attempts to manually turn motor 68 are made. Thus, when motor 68 is braked and a person, for example, exerts a force on a component of person support apparatus 20 that is moved via an actuator driven by motor 68, motor 68 will resist movement of the associated actuator and the component of the person support apparatus 20 to which the actuator is coupled. The amount of braking force that motor 68 provides, in at least some embodiments, is up to 10 kilonewtons or more, when motor 68 is actively braked via controller 70 and/or passively braked via the closing of fifth switch 76.

In at least one embodiment, controller 70 is modified from that shown in FIG. 3 to oversee and control the operation of all four actuators 32-38. In this embodiment, controller 70 includes sixteen outputs that are each coupled to the gates of sixteen different MOSFET switches (four groups of switches 72a-72d). Each group of four switches 72a-d controls the operation of one of the motors in one of the actuators 32-38. Controller 70 is adapted to allow completely independent control of each of these four actuators. That is, controller 70 may brake any one or more of the four motors of these actuators 32-38 while simultaneously driving any one or more of the other motors. Further, the speed and direction in which each of the four motors 68 are driven is controlled by controller 70 independently of the speed and/or direction of the other four motors 68. Controller 70 is in electrical communication with one or more control panels—such as, but not limited to, control panel 88 in FIG. 1—supported on person support apparatus 20 that include inputs for moving actuators 32-38, and controller 70 carries out the appropriate control of actuators 32-38 in response to these inputs.

Control system 66 ensures that the components of person support apparatus 20—such as the seat 22, backrest 24, and leg rest 26—are braked and will not substantially move when power is not being supplied to the motors 68 or the corresponding actuators. Still further, as has been described above, control system 66 ensures that the braking takes place regardless of whether or not electrical power is supplied to person support apparatus 20. Thus, for example, if person support apparatus 20 has no battery—or the battery becomes drained—and its electrical power cord is unplugged from an AC wall outlet, passive braking will still automatically take place via fifth switch 76. Alternatively, if person support apparatus 20 is connected to a source of electrical power—whether battery, an AC outlet, or both—controller 70 will automatically brake the motors 68 via the appropriate switching of switches 72a-d in H-bridge 74. The components of person support apparatus 20 therefore do not substantially move when the motors 68 are not being electrically driven. This helps prevent inadvertent movement and improves the safety of person support apparatus 20. Further, this enables controller 70, or some other controller, to more easily keep track of the current position of each actuator 32-38 by substantially preventing movement that might not otherwise be easily detectable, such as when electrical power is not supplied to person support apparatus 20.

Figure 7:
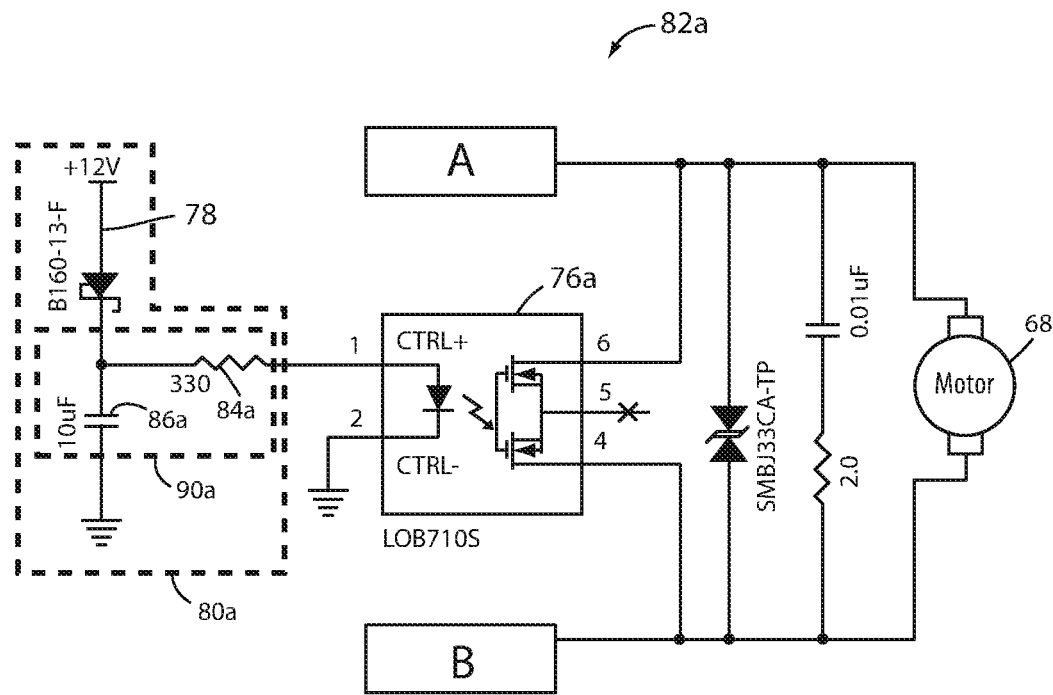
FIG. 7 is an electrical schematic of a second embodiment of a motor circuit that may be coupled to leads A and B of the circuit of FIG. 5.

FIG. 7 illustrates in greater detail an alternative motor circuit 82a that may be incorporated into control system 66 in place of motor circuit 82. Motor circuit 82a includes a solid state switch 76a, a control circuit 80a, and connections to motor 68. Motor circuit 82a differs from motor circuit 82 in that it includes solid state switch 76a instead of the electromechanical relay that is used to implement switch 76. Control circuit 80a also differs from control circuit 80 in that it includes a delay circuit 90a having a resistor 84a and capacitor 86a that are of different values than resistor 84 and capacitor 86. These different values accommodate the different electrical characteristics of solid state switch 76a. The delay function provided by delay circuit 90a, however, remains the same. That is, resistor 84a and capacitor 86a define a resistive-capacitive (RC) circuit having a time constant that is determined by the values of resistor 84a and capacitor 86a. When voltage source 78 is terminated, control circuit 80a continues to supply a positive voltage to one terminal of solid state switch 76a for a time generally equal to the RC time constant of circuit 80a. This keeps solid state switch 76a open for a fraction of a second after electrical power is lost, thereby helping to prevent damage to any of MOSFETs 72a-d. After a time equal to or greater than the RC time constant passes, solid state switch 76a returns to its normally closed state, thereby short circuiting the terminals of motor 68 and braking motor 68 from further movement.

Figure 8:
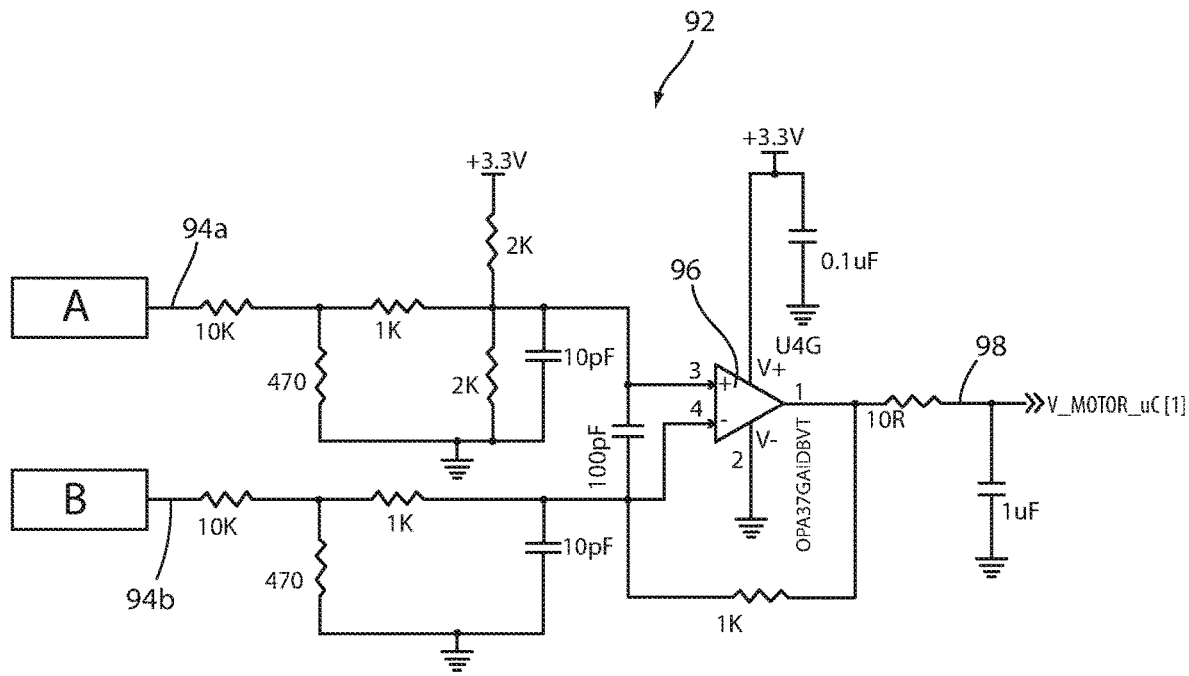
FIG. 8 is an electrical schematic of a voltage sensing circuit that is coupled, in some embodiments, to the leads A and B of the circuit of FIG. 5.

FIG. 8 illustrates a voltage sensing circuit 92 that is included within control system 66 in at least some embodiments. Voltage sensing circuit 92 is used by control system 66 to detect when motor 68 is moved when no electrical power is applied to motor 68. Typically, such movement is due to mechanical forces being applied to the component (or components) of person support apparatus 20 associated with motor 68 that exceed the braking ability of motor 68. That is, if motor 68 powers backrest actuator 34, for example, a force exerted against backrest 24 when motor 68 is not receiving any electrical power from control system 66 will cause a voltage to be generated across the terminals of motor 68 due to motor 68 acting as a generator. When this applied force reaches a high enough level such that it overcomes the braking force of motor 68, motor 68 will begin turning and the back-emf (electromotive force) in motor 68 will rise. Voltage sensing circuit 92 senses this rise in the back-emf and feeds it to controller 70, which compares it to a threshold. If the voltage exceeds the threshold, controller 70 issues a notification to the user.

More specifically, voltage sensing circuit 92 of FIG. 8 includes two inputs 94a and 94b that are electrically coupled to terminals A and B of H-bridge 74 of FIG. 5. Inputs 94a and 94b are both conditioned and fed to inputs of a comparator 96. Comparator 96 outputs a signal on an output line 98 that is directly proportional to the difference, if any, between inputs 94a and 94b. The signal on output line 98 is then digitized and fed to controller 70. Controller 70 reads the digitized signal from output line 98 and compares its amplitude to a threshold value stored in a memory. If the amplitude exceeds the stored threshold, controller 70 issues a notification via control panel 88. In some instances, the notification is an audio and/or visual indication that a potential error has been detected. In other instances, controller 70 compares the amplitude of the digitized output from line 98 to a second and higher threshold, and if the second and higher threshold is exceeded, controller 70 prevents further operation of motor 68 until its corresponding actuator is recalibrated and/or other corrective measures are taken by a technician.

In still other embodiments, the signal from line 98 is processed in other manners. For example, in at least one embodiment, the signal from line 98 is integrated with respect to time and this time integral is compared to a threshold by controller 70. In still another variation, only those signals on line 98 that exceed a minimum value are integrated and compared to the threshold. In still another embodiment, controller 70 uses a maturity counter algorithm that only results in issuing an error notification if a minimum number of successive readings on output line 98 are above a threshold. Still other types of filtering and processing of the signals on line 98 are possible.

Figure 9:
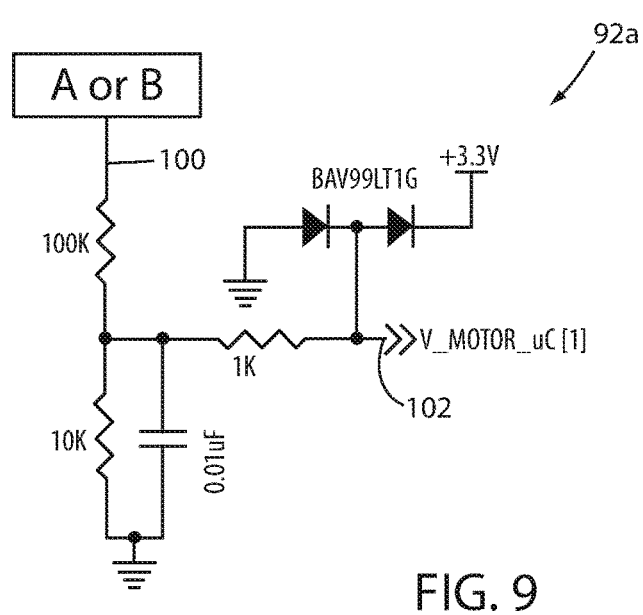
FIG. 9 is an electrical schematic of an alternative voltage sensing circuit that is coupled, in some embodiments, to one of the leads A and B of the circuit of FIG. 5.

FIG. 9 illustrates an alternative embodiment of a voltage sensing circuit 92*a* that may be used in lieu of the voltage sensing circuit 92 of FIG. 8. Voltage sensing circuit 92*a* includes an input 100 that is coupled to one of terminals A and B of H-bridge 74 of FIG. 5. Another voltage sensing circuit 92*a* that is identical to the one shown in FIG. 9 is coupled to the other of the terminals A and B of FIG. 5. Thus, for each motor 68, two voltage sensing circuits 92*a* are utilized: one coupled to terminal A and the other coupled to terminal B.

Voltage sensing circuit 92*a* conditions the input 100 and feeds it to an output line 102. Output line 102 is digitized and fed to controller 70. Controller 70 reads the value input on line 102 from the first of the two voltage sensing circuits 92*a*, reads the value input on line 102 from the second of the two voltage sensing circuits 92*a*, and determines the difference between the two. This difference is then processed in any of the manners described above and compared to one or more thresholds. If the compared value exceeds one or more of the thresholds, an error is indicated on control panel 88. It can therefore be seen that when using voltage sensing circuit 92*a*, controller 70 computes the back-emf of motor 68 by determining the difference between the output lines 102. On the other hand, when using voltage sensing circuit 92, this difference is determined by comparator 96 and fed into controller 70. Still other types of voltage sensing circuits 92, 92*a* may be used by control system 66, as would be known to one of ordinary skill in the art.

The purpose of voltage sensing circuits 92 or 92*a* is to sense if motor 68 "drifts" when no electrical power is being applied to it. The term "drift" refers to movement of motor 68 when no electrical power is applied to motor 68. The detection of such movement is used by control system 66 to determine if motor 68 has moved due to applied physical forces, rather than electrical current. If such movement is detected, the position of motor 68 will be somewhere other than what is expected by controller 70. That is, in some embodiments, controller 70 is in communication with one or more sensors that monitor the movement of motor 68, such as, but not limited to, internal Hall-effect sensors. Such sensors provide feedback to controller 70 regarding the position of motors 68 when power is applied to the motors 68. However, when the motors are not driven, the sensors do not provide such feedback. By including voltage sensing circuits 92 and/or 92*a*, controller 70 is able to detect movement of the motors 68 when they are not being electrically driven.

It will be understood by those skilled in the art that the one or more thresholds used by controller 70 in evaluating outputs 98 and/or 102 are based upon the characteristics of the particular motor 68, as well as the maximum braking force created by the motor 68 when its terminals are shorted. That is, the enhanced braking power of the motor 68 when its terminals are shorted is primarily due to the induced current in the short circuit which, due to Lenz's law, resists movement of motor 68. When motor 68 is effectively resisting an applied force (i.e. not moving in response to the applied force), the voltage generated across the terminals of motor 68 is negligible. However, when more and more force is applied to motor 68, the windings within motor 68 eventually saturate and motor 68 no longer is able to induce enough current to resist movement. At that point, motor 68 begins to move and the voltage across its terminals increase above the negligible level that otherwise exists when motor 68 is resisting a smaller applied force. The one or more thresholds used by controller 70 are related to this transition point at which motor 68 starts moving in response to an applied force.

In some embodiments, controller 70 is further programmed with one or more algorithms for converting the back-emf detected by voltage sensing circuits 92 or 92*a* into an estimate of how far motor 68 has moved (e.g. number of revolutions or fractions of revolutions) when electrical power is not being applied to motor 68. Alternatively, controller 70 may be programmed to convert the detected back-emf into an estimate of how far the corresponding actuator has moved, or an estimate of the current angle and/or position of the component (e.g. seat 22, backrest 24, and/or leg rest 26) that is moved by the corresponding motor 68. In any of these embodiments, controller 70 is programmed to carry out the conversion by utilizing data that has been experimentally gathered from movement of one or more components of person support apparatus 20 when the motors 68 are not being driven. By converting the back-emf to a distance, position, and/or angle, controller 70 is able to update a current estimate of the position of the motor 68 and/or the component of person support apparatus 20 that is moved by motor 68. Thus, controller 70 is able to account for the movement of the chair even when such movement is due to physical forces applied to the person support apparatus 20, rather than from the one or more motors 68 being driven. This information is used by controller 70 when moving one or more of the movable components (e.g. seat 22, backrest 24, and/or leg rest 26) of person support apparatus 20 to a desired position.

As was noted previously, person support apparatus 20 includes four actuators: seat actuator 32, backrest actuator 34, lift actuator 36, and leg rest actuator 38. Further, each of these actuators includes a motor 68. Controller 70 is programmed to carry out the braking and the back-emf detecting functions described previously for each of these motors 68. That is, when actuators 32-38 are to be braked, controller 70 short circuits the terminals of each of the four motors 68 associated with these four actuators, as discussed above. Further, when these four motors 68 are braked, controller 70 monitors each of the four motors 68 for back-emf using four separate voltage sensing circuits 92 (or eight voltage sensing circuits 92*a*). In at least one embodiment, controller 70 compares the back-emf from each of these four motors 68 to a common threshold and issues an error notification if one or more of the motors experiences back-emf that exceeds the threshold. In at least one other embodiment, different thresholds are used for different ones of the motors 68.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A person support apparatus comprising:
a support surface adapted to support a person thereon;
an actuator adapted to move a first component of the person support apparatus with respect to a second component;
a motor adapted to drive the actuator; and
a control system adapted to brake the motor, the control system further being adapted to:
(1) detect a voltage across terminals of the motor when the control system brakes the motor;
(2) compare a quantity based on an amplitude of the detected voltage, a duration of the detected voltage, or combination thereof to a threshold; and
(3) if the quantity exceeds the threshold, use the quantity to estimate how far the first component has moved while the motor was braked.

2. The person support apparatus of claim 1 wherein the first component is a backrest adapted to pivot to different angular orientations.

3. The person support apparatus of claim 1 wherein the control system brakes the motor by short circuiting terminals of the motor.

4. The person support apparatus of claim 1 wherein the control system is adapted to short circuit terminals of the motor in a first manner using a plurality of switches and in a second manner using a switch different from the plurality of switches, the control system short circuiting the motor in the first manner when electrical power is supplied to the control system and the control system short circuiting the motor in the second manner when electrical power is not supplied to the control system.

5. The person support apparatus of claim 4 wherein the control system delays short circuiting the motor terminals in the second manner for a predetermined time after electrical power is not supplied to the control system, the predetermined time being based on a resistor-capacitor (RC) circuit.

6. The person support apparatus of claim 1 wherein the control system includes a plurality of switches arranged in an H-bridge configuration with the motor.

7. The person support apparatus of claim 6 wherein the control system drives the motor in a first direction by closing a first subset of the plurality of switches and opening a second subset of the plurality of switches, and the control system drives the motor in a second direction opposite the first direction by opening the first subset of switches and closing the second subset of switches.

8. The person support apparatus of claim 7 wherein the control system brakes the motor by opening at least one of the switches in the first subset and at least one of the switches in the second subset.

9. The person support apparatus of claim 1 further comprising a sensor adapted to detect movement of the actuator when electrical power is being applied to the motor, wherein the control system uses the sensor to keep track of a position of the actuator when the motor is driven and the control system uses the quantity to update the position when the motor is braked.

10. The person support apparatus of claim 1 wherein the control system is further configured to use previously gathered experimental data when estimating how far the first component has moved while the motor was braked.

11. The person support apparatus of claim 10 wherein the person support apparatus is one of a recliner, stretcher, and a bed.

12. A person support apparatus comprising:
a base having a plurality of wheels;
a support surface adapted to support a person thereon, the support surface comprising a backrest and a seat;
an actuator having a motor adapted to pivot the backrest with respect to the seat;
a sensor adapted to detect movement of the backrest when the motor is driven;
a voltage sensor adapted to detect a voltage across terminals of the motor when the motor is braked; and
a control system adapted to keep track of a position of the backrest using outputs from both the sensor and the voltage sensor, the control system using the outputs from the sensor to keep track of the position of the backrest when the motor is being driven and the control system using the outputs from the voltage sensor to keep track of the position of the backrest when the motor is being braked.

13. The person support apparatus of claim 12 wherein the sensor is a Hall-effect sensor.

14. The person support apparatus of claim 12 further comprising:
a second actuator having a second motor adapted to move the seat;
a second sensor adapted to detect movement of the seat when the second motor is driven;
a second voltage sensor adapted to detect a voltage across terminals of the second motor when the second motor is braked; and
wherein the control system is further adapted to keep track of a position of the seat using outputs from both the second sensor and the second voltage sensor, the control system using the outputs from the second sensor to keep track of the position of the seat when the second motor is being driven and the control system using the outputs from the second voltage sensor to keep track of the position of the seat when the second motor is being braked.

15. The person support apparatus of claim 14 wherein the sensor and the second sensor are both Hall-effect sensors.

16. The person support apparatus of claim 12 wherein the control system is further adapted to perform the following:
(1) compute a quantity based on an amplitude, a duration, and/or a combination of the amplitude and duration of a voltage detected by the voltage sensor across the terminals of the motor when the motor is braked;
(2) compare the quantity to a threshold; and
(3) if the quantity exceeds a threshold, use the quantity to estimate how far the backrest has moved while the motor was braked.

17. The person support apparatus of claim 16 wherein the control system is further configured to use previously gathered experimental data when estimating how far the backrest has moved while the motor was braked.

18. The person support apparatus of claim 12 wherein the control system is adapted to short circuit terminals of the motor in a first manner using a plurality of switches and in a second manner using a switch different from the plurality of switches, the control system short circuiting the motor terminals in the first manner when electrical power is supplied to the control system and the control system short circuiting the motor terminals in the second manner when electrical power is not supplied to the control system.

19. The person support apparatus of claim 12 wherein the control system includes a plurality of switches arranged in an H-bridge configuration with the motor, and the control system drives the motor in a first direction by closing a first subset of the plurality of switches and opening a second subset of the plurality of switches, and the control system drives the motor in a second direction opposite the first direction by opening the first subset of switches and closing the second subset of switches.

20. The person support apparatus of claim 19 wherein the person support apparatus is one of a recliner, stretcher, and a bed.

* * * * *